US009276880B2

(12) United States Patent
Leeds (10) Patent No.: US 9,276,880 B2
(45) Date of Patent: Mar. 1, 2016

(54) JUNK ELECTRONIC MAIL DETECTOR AND ELIMINATOR (71) Applicant: Robert G. Leeds, Brentwood, TN (US)

(72) Inventor: Robert G. Leeds, Brentwood, TN (US)

(*) Notice: Subject to any disclaimer, the term of this patent is extended or adjusted under 35 U.S.C. 154(b) by 210 days.

(21) Appl. No.: 13/850,025

(22) Filed: Mar. 25, 2013

(65) Prior Publication Data
US 2013/0290447 A1 Oct. 31, 2013

Related U.S. Application Data (63) Continuation of application No. 10/738,131, filed on Dec. 18, 2003, now Pat. No. 8,412,778, which is a continuation of application No. 10/119,646, filed on Apr. 10, 2002, now abandoned, which is a continuation of application No. 09/086,345, filed on May 29, 1998, now Pat. No. 6,393,465.

(60) Provisional application No. 60/066,292, filed on Nov. 25, 1997.

(51) Int. Cl.
H04L 12/58 (2006.01)
H04L 29/06 (2006.01)

(52) U.S. Cl.
CPC .............. *H04L 51/00* (2013.01); *H04L 12/585* (2013.01); *H04L 51/12* (2013.01); *H04L 51/14* (2013.01); *H04L 63/0236* (2013.01); *H04L 63/08* (2013.01)

(58) Field of Classification Search
CPC ................................ H04L 51/12; H04L 51/14
See application file for complete search history.

(56) References Cited

U.S. PATENT DOCUMENTS

| 5,377,354 | A | * | 12/1994 | Scannell et al. ............... 718/103 |
| 5,555,426 | A | | 9/1996 | Johnson et al. |
| 5,613,108 | A | | 3/1997 | Morikawa |
| 5,619,648 | A | * | 4/1997 | Canale et al. ................. 709/206 |
| 5,627,764 | A | | 5/1997 | Schutzman et al. |
| 5,632,018 | A | | 5/1997 | Otorii |
| 5,675,733 | A | | 10/1997 | Williams |
| 5,826,022 | A | | 10/1998 | Nielsen |
| 5,859,967 | A | | 1/1999 | Kaufeld et al. |
| 5,872,915 | A | | 2/1999 | Dykes et al. |
| 5,884,033 | A | | 3/1999 | Duvall et al. |
| 5,930,479 | A | * | 7/1999 | Hall ............................... 709/238 |
| 5,941,947 | A | * | 8/1999 | Brown et al. ................. 709/225 |
| 5,944,787 | A | | 8/1999 | Zoken |

(Continued)

OTHER PUBLICATIONS

Bass, Tim and Watt, Glenn, Lt. Col, A Simple Framework for Filtering Queued SMTP Mail (Cyberwar Countermeasures), MILCOM 97 Proceedings, Nov. 5, 1997, pp. 1140-1144, vol. 3, Monterey, CA, USA.

TIS First to Offer Anti-Spamming Solution—Guantlet ® Firewalls Protect Against Illicit E-Mail Traffic, Trusted Information, Inc., PRNewswire, Dec. 16, 1997.

(Continued)

*Primary Examiner* — Aaron Strange
(74) *Attorney, Agent, or Firm* — Rothwell, Figg, Ernst & Manbeck, P.C.

(57) ABSTRACT

A method and system for parsing and analyzing incoming electronic mail messages to determine a confidence factor indicative of whether or not the messages are junk e-mail. The method and system utilize message services which attempt to contact the purported sender in order to verify that the identified host computer actually exists and accepts outgoing mail services for the specified user. The routing history is also examined to ensure that identified intermediate sites are also valid. Likewise, seed addresses can alert an e-mail provider to potential mass mailings by reporting when mail is received for ghost or non-existent accounts.

7 Claims, 9 Drawing Sheets (56) References Cited

U.S. PATENT DOCUMENTS

| | | | |
|---|---|---|---|
| 5,991,810 A | | 11/1999 | Shapiro et al. |
| 5,999,967 A | | 12/1999 | Sundsted |
| 6,112,227 A | * | 8/2000 | Heiner .................... 709/203 |
| 6,199,102 B1 | * | 3/2001 | Cobb ...................... 709/206 |
| 6,249,805 B1 | * | 6/2001 | Fleming, III ............ 709/206 |
| 6,453,327 B1 | * | 9/2002 | Nielsen ................... 715/205 |

OTHER PUBLICATIONS

Reichard, Kevin, Take Spam Off the Menu, Internet World, Feb. 1998, p. 42, Unisyn Corp.

Glass, Brett, E-mail headers can help diagnose problems, identify spammers, Infoworld, Nov. 3, 1997.

Evans, James, Mail OverLoad, Internet World, Dec. 1997, pp. 55-58.

* cited by examiner

FIG. 1

From 48941403@notarealaddress.com Wed Sep 17 19:12:59 1997

Return Path: <48941403@notarealaddress.com>

Received: from address.foreign (address.foreign [194.45.108.1]) by mrin59.mail.notarealaddress2.com (8.8.5/8.8.5/Notarealaddress2-4.0.0) with SMTP id TAA21109: Wed. 17 Sep 1997 19:12:40 -0400 (EDT)

From: 48941403@notarealaddress.com

Received: from picard.nor.de (ip222.saint-petersburg.fl.pub-ip.notarealaddress3.net[38.11.234.222]) address.foreign (8.6.9/8.6.9) with SMTP id BAA28374: Thu. 18 Sep 1997 01:12:13 -0200

Received: from junker.notarealaddress3.com(reg1.notarealaddress3.com(316.5.76.7)) by junker@notarealaddress3.com (8.8.5/8.6.5) with SMTP id GAA05984 for<subscribers>: Wed. 17 Sep 1997 18:48:18-0600 (EST)

Date: Wed. 17 Sep 97 18:48:18 EST

To: subscribers@address.foreign

Subject: WORK FROM HOME**[700 Companies Hiring Employees]

Message-ID: <338498531.ra.19789314@notarealaddress3.com>

Reply-To: junker@notarealaddress3.com

X-PMFLAGS: 34078848 0

X-UIDL: 2394741032a1284574706b3145324137

Comments: Authenticated sender is <junker@notarealaddress3.com>

FIG. 2

Return Path: <members@membershiplist.com>

Received: from relay19.mail.notarealaddress2.com (relay19.mail.notarealaddress2.com [172.31.106.65]) by air15.mail.notarealaddress2.com (v36.0) with SMTP: Fri. 07 Nov 1997 22:04:04 1900

Received: from Membershiplist.com([192.35.50.17]) by relay 19.mail.notarealaddress2.com(8.8.5/8.8.5/Notarealaddress2-4.0.0) with ESMTP id XAA29060: Tue. 4 Nov 1997 23.29.43 -0500 (EST)

Received: from list.membershiplist.com (list.membershiplist.com [17.184.4.92]) by membershiplist.com (8.8.5/8.8.5) with SMTP id UAA 13329: Tue. 4 Nov 1997 20:28:26 -0800 (PST)

Date: Tue. 4 Nov 97 21:32:03 -0800

Message-Id: <19971105043033.AAA24026@[17.184.9.21]>

From: list_manager@membershiplist.com (List Manager)

Subject: Press Kit--Deadline is 11.7

To: "Members" <members@membershiplist.com>

Mime-Version: 1.0

Content-Type: multipart/mixed: boundary="Emailer_-1325890456"

Comments: Authenticated sender is <mail_masterz@commercialmailer.com>

FIG. 3

Test of Deliverability

Read Message 1

Read Message 2

Read Message 3...

Parse Header of Message 1

Parse Header of Message 2

Parse Header of Message 3...

Create automatic Message Reply 1 using Reply to Field

Create automatic Message Reply 2 using Reply to Field

Create automatic Message Reply 3 using Reply to Field

Send Message Reply 1

Send Message Reply 2

Send Message Reply 3

Read Mail with Message Reply 1 Subject

Read Mail with Message Reply 2 Subject

Read Mail with Message Reply 3 Subject

If Mail with Message Reply 1, 2, 3, n... is undeliverable

Then Mark Message as Suspected Junk E-Mail

Then Route to trash or junk e-mail suspect holding location Else Message Passes Test of Deliverability

FIG. 4

Confidence Testing of Message

Read Message 1

Read Message 2

Read Message 3...

Parse text of Message for phrases and keywords

Add to list of rules for phrases and keywords

If phrase or keyword is in list of suspect junk mail phrases

Then assign percentage indicating probability of status as junk mail,     Then continue reading message for other phrases or keywords in list Repeat until message completed or mail is rated at confidence ratio of 100%

Until all messages and replies are read

JUNK ELECTRONIC MAIL DETECTOR AND ELIMINATOR

This application is a continuation of application Ser. No. 10/738,131, filed Dec. 18, 2003, which is a continuation of application Ser. No. 10/119,646, filed Apr. 10, 2002, now abandoned, which is a continuation of application Ser. No. 09/086,345, filed May 29, 1998, now U.S. Pat. No. 6,393,465, issued May 21, 2002, and which claims the benefit of Provisional Application Ser. No. 60/066,292 filed Nov. 25, 1997, the entire contents of each of which are incorporated herein by reference.

BACKGROUND OF THE INVENTION

1. Field of the Invention

The present invention concerns electronic messaging in general and electronic mail in particular, and provides a method and system for handling electronic mail messages, verifying the origination of messages to determine the probability that they are or are not junk e-mail, and detecting that a mass mailing has been initiated by utilizing special addresses.

2. Description of the Background

Digital storage of information brings with it the ability to transfer such information easily and inexpensively. As a result of this situation, unwanted or unsolicited junk e-mail (sometimes referred to as "spam") has become prevalent on the Internet since messages can be sent without a specific "per-character" cost. As a result, the average e-mail account currently receives a number of unsolicited, unwelcome pieces of junk e-mail each day, with a rapidly increasing number of pieces being forecast.

Documents are available which describe electronic mail handling procedures. In particular, two Internet standards on e-mail are incorporated herein by reference in their entirety. They are: Internet STD0014 entitled "MAIL ROUTING AND THE DOMAIN SYSTEM" (also known as RFC 974) and Internet STD0010 entitled "SIMPLE MAIL TRANSFER PROTOCOL" (also known as RFC 821). The contents of the Second Edition of "sendmail" by Bryan Costales and Eric Allman, published by O'Reilly Publishing, is also incorporated herein by reference. Further, some issued patents address the general handling of electronic mail. For example, U.S. Pat. No. 5,377,354 teaches a method for prioritizing a plurality of incoming electronic mail messages by comparing the messages with a list of key words. U.S. Pat. No. 5,619,648 teaches a method for reducing junk e-mail which uses non-address information and uses a filtering system that has access to models of the user's correspondents. The e-mail system adds a recipient identifier that is used to further specify the recipients in the group to whom the message is sent who should actually receive the message.

U.S. Pat. No. 5,555,426 teaches a method and apparatus for disseminating messages to unspecified users in a data processing system. The method permits users to associate conditions of interest, such as keywords or originator identities, but does not perform any verification of the originator's identity. The method permits messages to be sent based upon probable interest in the message, rather than being addressed to any specific individual.

U.S. Pat. No. 5,627,764 teaches a method for implementing a rules-based system that can run a user's set of rules under system control and process messages according to the user's rules. Peloria Mail Scout uses rules to screen junk mail by limiting messages to only known and acceptable senders, but makes no provision for unknown, yet acceptable senders.

U.S. Pat. No. 5,675,733 teaches a method for collecting, sorting, and compiling statistical summaries of message acknowledgment data, also known as Confirmations of Delivery or COD's. The invention teaches a method for acknowledging a single message to multiple recipients and generating a statistical list of information delivery under such circumstances. Each of the above-referenced US patents are incorporated herein by reference in their entirety.

SUMMARY OF THE INVENTION

It is an object of the present invention to address deficiencies in known e-mail handling systems.

This object and other objects of the present invention are addressed through the use of a computer system or mail handling system which provides enhanced blocking of junk e-mail. Accordingly, the present invention first ascertains if the sender of the e-mail has a verifiable identity and valid computer address. Based upon that determination, certain user-assignable and computable confidence ratios may be automatically determined. If the identity cannot be verified or the address is determined not to be valid or usable for a reply to the sender, the mail can be assigned a presumptive classification as junk e-mail. By applying additional filters, the confidence ratio can be increased to nearly 100%, and the mail can be handled in accordance with standard rules-based procedures, providing for a range of alternatives that include deletion or storage in a manner determined by the user.

The system of the present invention also advantageously utilizes a cooperative tool, known as an authenticator, to determine if a received e-mail is a junk e-mail. The mail handling system, either automatically or as part of a mail filter, contacts an authenticator with information about a received e-mail. If the authenticator has received negative or adverse notifications from other users who have received the same or similar e-mails, the authenticator informs any mail handling systems that ask that the received e-mail is very likely junk e-mail. This information from the authenticator along with other factors can be weighted to provide an overall confidence rating.

The system of the present invention also advantageously utilizes a list of "seed" addresses that do not correspond to real users but, rather, to special non-existent (or ghost) accounts. When a message is received that is addressed to a ghost account, the system searches other incoming and recently received messages for the same message body. For messages with the same message body as received for the ghost account, the system marks the messages as having a high probability of being junk e-mail. In an alternate embodiment, the system of the present invention provides cooperative filtering by sending the message body to authenticators or other systems to help the authenticators or other systems to determine that the message is probably a junk e-mail.

DETAILED DESCRIPTION OF THE PREFERRED EMBODIMENT

Figure 1:
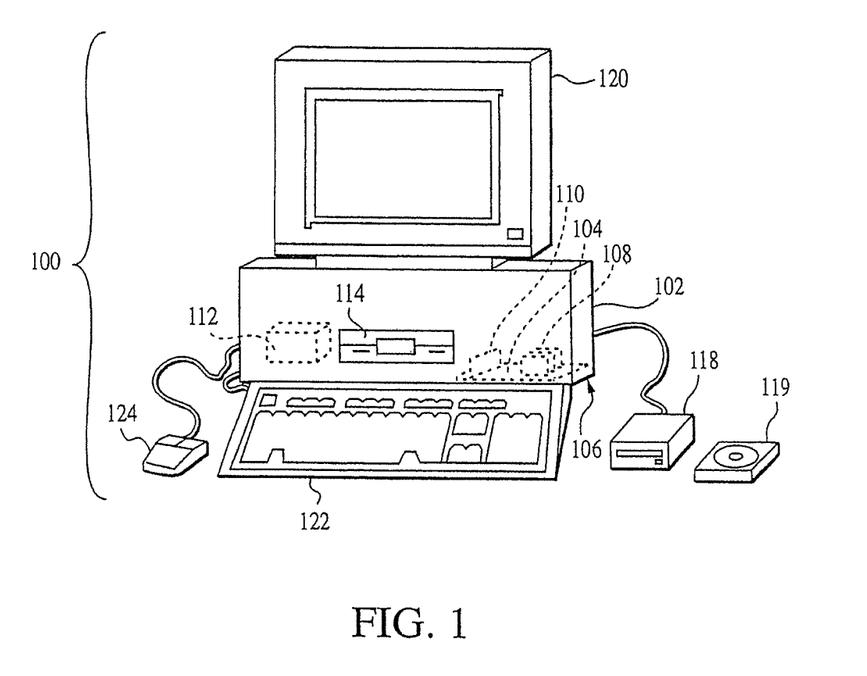
FIG. 1 is a schematic illustration of a computer system for performing the method of the present invention.

Referring now to the drawings, wherein like reference numerals designate identical or corresponding parts throughout the several views, FIG. 1 is a schematic illustration of a computer system for blocking unwanted or junk e-mails. A computer 100 implements the method of the present invention, wherein the computer housing 102 houses a motherboard 104 which contains a CPU 106, memory 108 (e.g., DRAM, ROM, EPROM, EEPROM, SRAM and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus or an Enhanced IDE bus). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit (not shown) or a compact disc jukebox (not shown). In addition, a printer (not shown) also provides printed e-mails.

The system further includes at least one computer readable medium. Examples of computer readable media are compact discs 119, hard disks 112, floppy disks, tape, magneto-optical disks, PROMS (EPROM, EEPROM, Flash EPROM), DRAM, SRAM, etc. Stored on any one or on a combination of the computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for blocking unwanted e-mails. These computer readable media can include programs, dynamic link libraries, scripts, or any other executable or interpreted code, including, but not limited to, Java code, C or C++ code, Perl scripts, and Active X controls.

The method and system of the present invention assign confidence ratings to messages to signify the statuses of the messages as junk e-mails or as a bona fide messages that the recipient may wish to read. The method and system begin by analyzing the origins and transmission paths of the messages. The sender's origination information is extracted from the e-mail message and an automatic reply (called a verification request) is created and sent. Based on the verification response that is received in response to the verification request, the sender is scored as to the probable characteristics, origination, validity, and desirability of the mail. Incoming messages (e-mails) are automatically scanned and parsed, either (1) at a server located at an Internet provider (prior to delivery to the intended ultimate recipient), (2) at a LAN-based receiving station, or (3) at the actual ultimate recipient's mail machine, i.e., local to the user. Once the message has been parsed or broken down into fields, the message is compared with several user defined rules for handling messages, and a confidence rating is assigned to the message. In one embodiment, the message header information is analyzed and a verification request(s) is/are automatically sent to the purported sender(s), as identified by fields such as "From:" or "Reply-To:". If there is a delivery problem in delivering the verification request, the presumed validity of the message is reduced in accordance with a set of user-definable criteria. In addition to determining the purported origination point, the present invention automatically analyzes all information pertaining to the sender, the path of delivery, any information pertaining to copies, blind copies, or other indicia of validity of the origin of the message to determine if there has been a discernable effort to obscure the origin, disguise the sender, or in some other way to inhibit the recipient from performing verification of the sender's identity. For example, if a message has purportedly been relayed through a machine named mail-.fromnowhere.com and the mail handling system has determined that such a machine does not actually exist, the confidence rating for the message should be increased.

Techniques for reducing the amount of junk e-mail by using confidence rating technology based upon characteristics of junk e-mail are also implemented in the invention. Factors that the invention incorporates in a determination of the status of mail as junk e-mail or a valid message, include maintaining (1) a list of certain mail providers known to be an origination point of junk e-mail, (2) a dictionary of certain content frequently found in junk email, and (3) a learning knowledge base that creates its own rules to ascertain prior junk e-mail characteristics and subsequently adds those criteria to the knowledge base to prevent future junk e-mail with the same or similar characteristics from being delivered.

Primary components of the invention are (1) screening all incoming messages by the receiver on either the mail server or the local receiving facility and (2) automatically sending a reply (in the form of a verification request) to the purported sender(s). The verification request is sent to all address locations contained in the sender's address information or any subset of those addresses as determined by the recipient. If that verification request is undeliverable (as determined by the receipt of the corresponding verification response), the message can be automatically deleted or marked as junk e-mail. In addition, rules filters can be used in conjunction with the presumptive test for a purported sender's address, to determine a confidence rating based upon a scoring technique, which the user can set forth based upon factors the user considers to be most significant. The e-mail filtering can be used in conjunction with the verification response to refine the confidence rating. As an example, a previously read junk e-mail can be added to the rules base to look for certain phrases. This may not be sufficient, however, to screen out valid mail that cites or quotes from the junk e-mail. If, however, the content is combined with an address that cannot pass a verification request, the user may wish to assign a 100% confidence rating, and the mail can optionally be automatically deleted.

Figure 2:
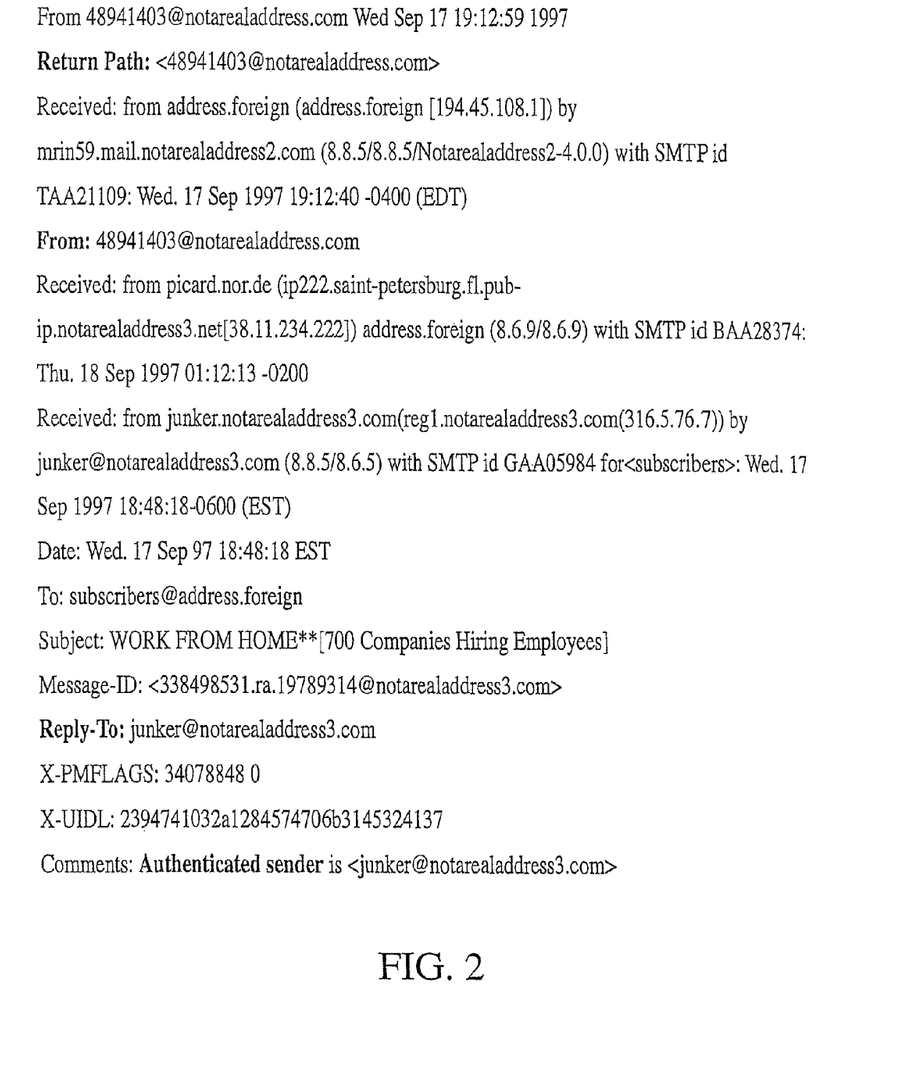
FIG. 2 is a listing of a first exemplary header that is analyzed according to the present invention.
Figure 3:
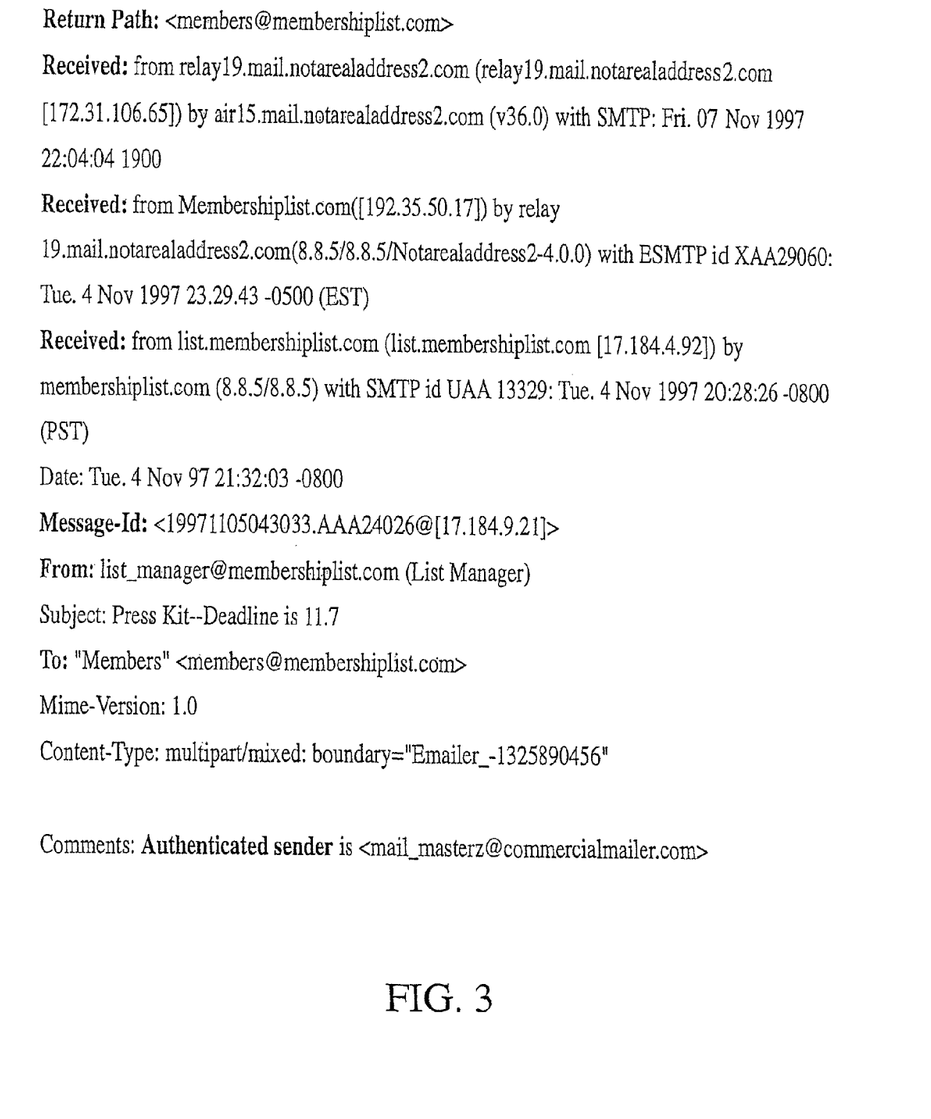
FIG. 3 is a listing of a second exemplary header that is analyzed according to the present invention.

FIG. 2 shows an exemplary e-mail header that is received by the system of the present invention. The fields for "Return Path:," "From:," and "Reply-To:" are highlighted as three of the fields which the present invention will parse from the message header. The line:

From: 48941493@notarealaddress.com
is broken down into a user id (48941493) and a host name (notarealaddress.com).
Likewise, the line:
Reply-To: junker@notarealaddress3.com
is also broken down into its corresponding user id (junker) and host name (notarealaddress3.com). Both of these addresses will receive verification requests attempting to verify that these addresses represent valid user and host names. The same process is performed on the message header shown in FIG. 3.

Accordingly, the system of the present invention can analyze e-mail headers to determine whether or not the e-mail has been received from a site suspected of sending junk e-mail. A received e-mail that-conforms to RFC 821 includes fields identifying the sender and the recipient, i.e., the "From:" and the "To:" fields, respectively. Messages may optionally contain a "Reply-To:" field if a user wishes to have his/her replies directed to a different e-mail address. Since junk e-mails often come from either non-existent users or non-existent sites or both, a first level check is to determine if the alleged sender identified by the "From:" or "Reply-To:" fields are valid. This first level check corresponds to issuing a verification request and can be in many forms, including: (1) sending a message to the user identified by the "From:" or "Reply-To:" fields and examining whether the message can be successfully delivered, (2) using the UNIX "whois" command to determine if a site (or host) by that name actually exists, (3) using the UNIX "finger" command to identify if a user name exists at a verifiable host, (4) using the "vrfy" command when connected to a sendmail daemon to verify that a user exists at a particular site, and (5) using the UNIX "traceroute" command to make sure there is a valid route back to the specified host. It is presently preferred to utilize a method which does not create an endless cycle of messages while attempting to verify a sender's address. That is, if each message generated a sender verification message which in turn generated a sender verification message, then the system would quickly become inundated with extra messages. Accordingly, the present invention utilizes messaging for sender verification that do not generate a cascade of new verification requests. In an alternate embodiment, the system keeps track of which verification requests are outstanding and thereby prevents cascading requests by limiting the system to sending a single verification message for a particular address within a period of time. The system thus maintains a cache of recently authorized and recently denied addresses.

Figure 4:
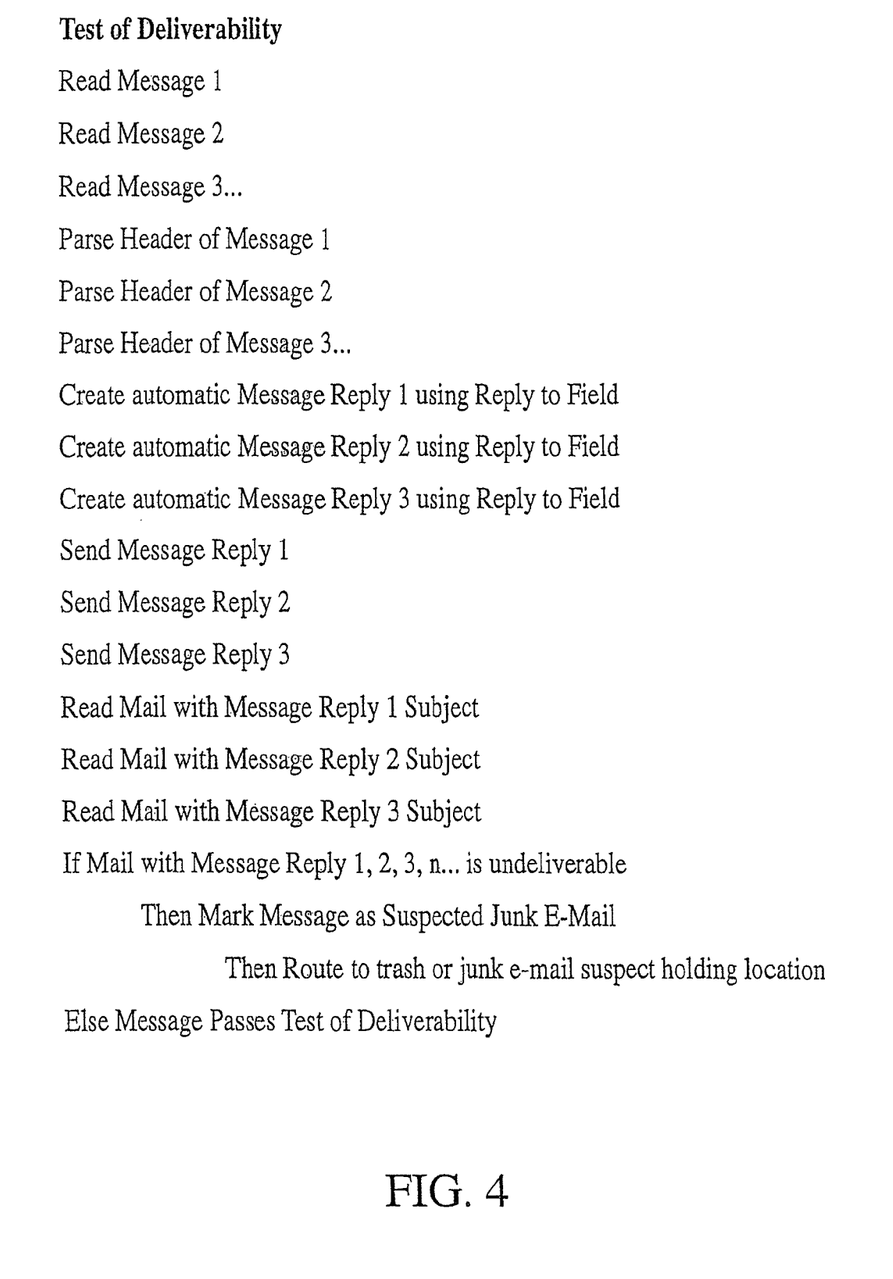
FIG. 4. is a pseudo-code listing of how deliverability is tested according to the present invention.

FIG. 4 shows a test of deliverability for three messages received by a mail handling system. Each of the three header messages is parsed into fields to enable the system to determine purported senders. The system then generates replies to the messages in the form of verification requests. Each of the verification requests is sent to the purported sender of its corresponding message, and the replies or verification responses are analyzed. For each of the verification requests that were undeliverable, the system marks the message as suspected junk e-mail, otherwise the message passes the sender deliverability test. Additionally, the verification request, when successful, performs the function of providing a return receipt verification.

Figure 5:
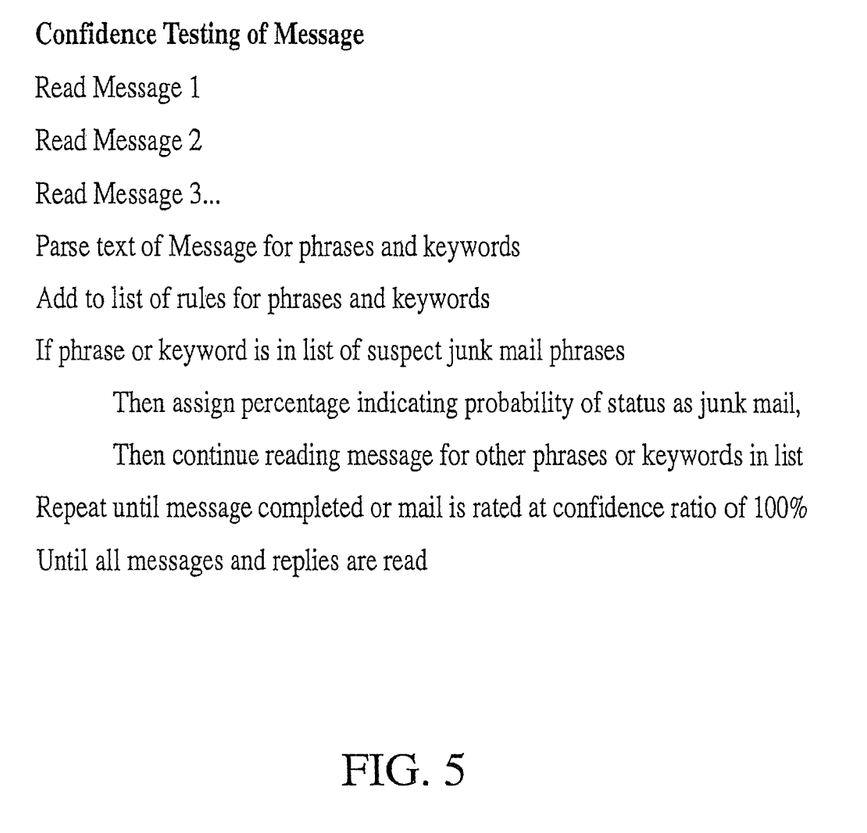
FIG. 5 is a pseudo-code listing of how confidence testing of a message is performed according to the present invention.

The process of FIG. 4 can be augmented in an alternate embodiment to include the confidence testing shown in FIG. 5. By analyzing phrases and keywords in the message bodies, better confidence values can be assigned to each e-mail message.

Figure 6A:
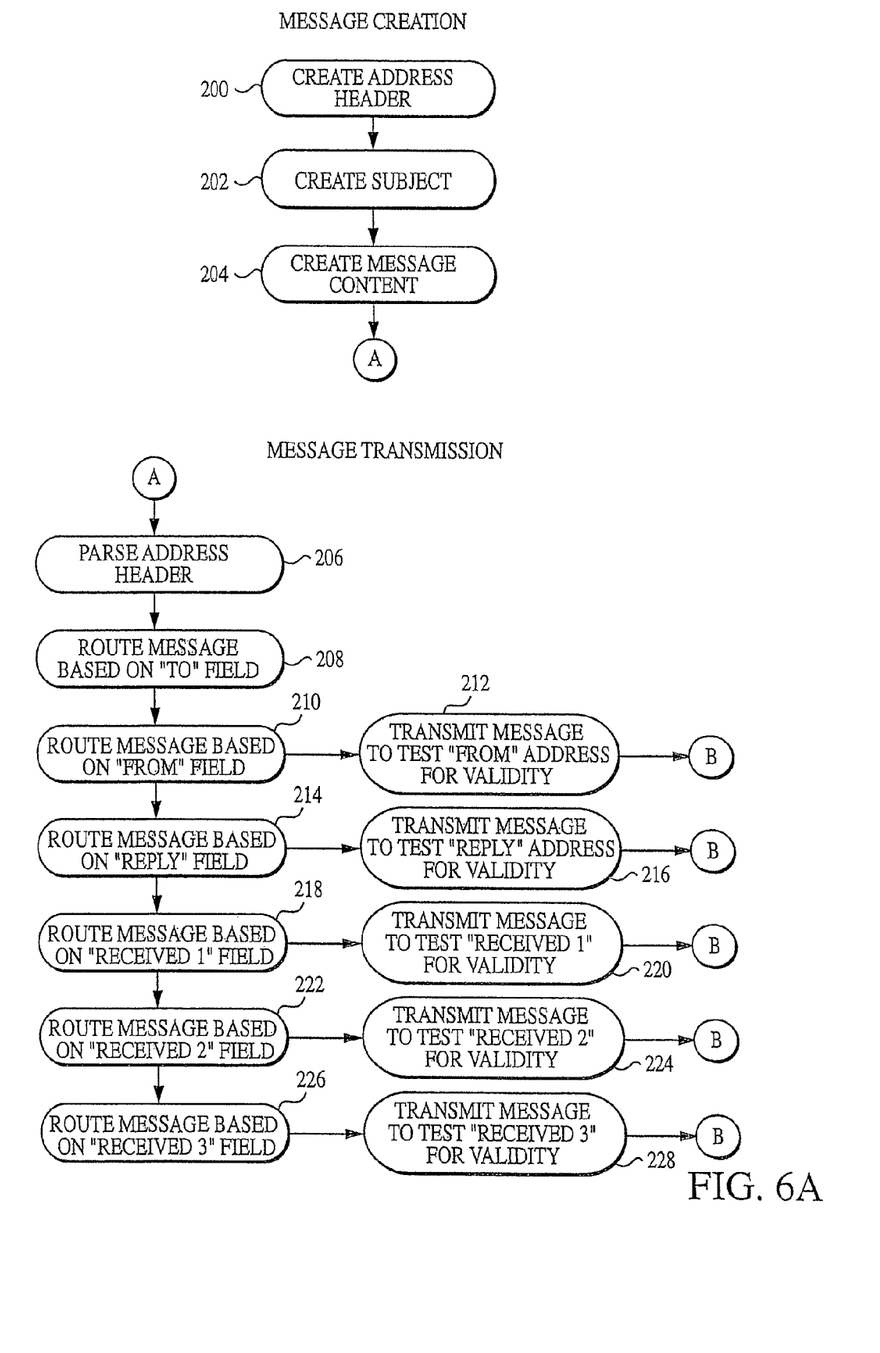
FIGS. 6A and 6B are flow diagrams of how message creation, transmission, and reception are processed according to the present invention.
Figure 6B:
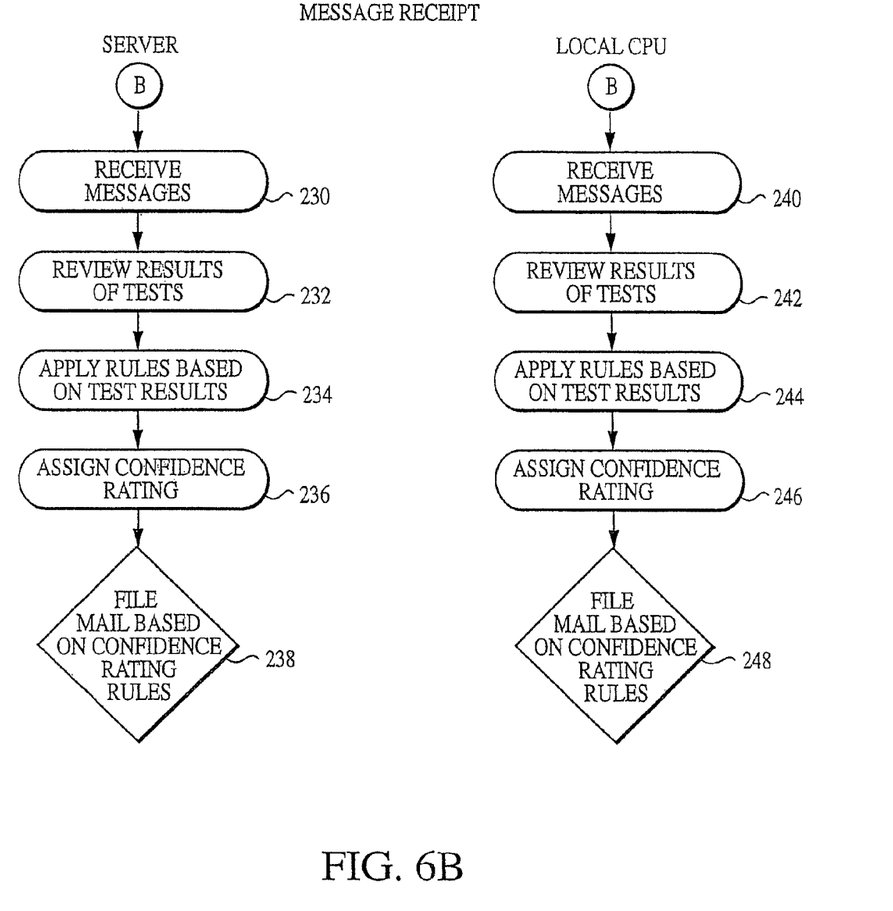
Figure 7:
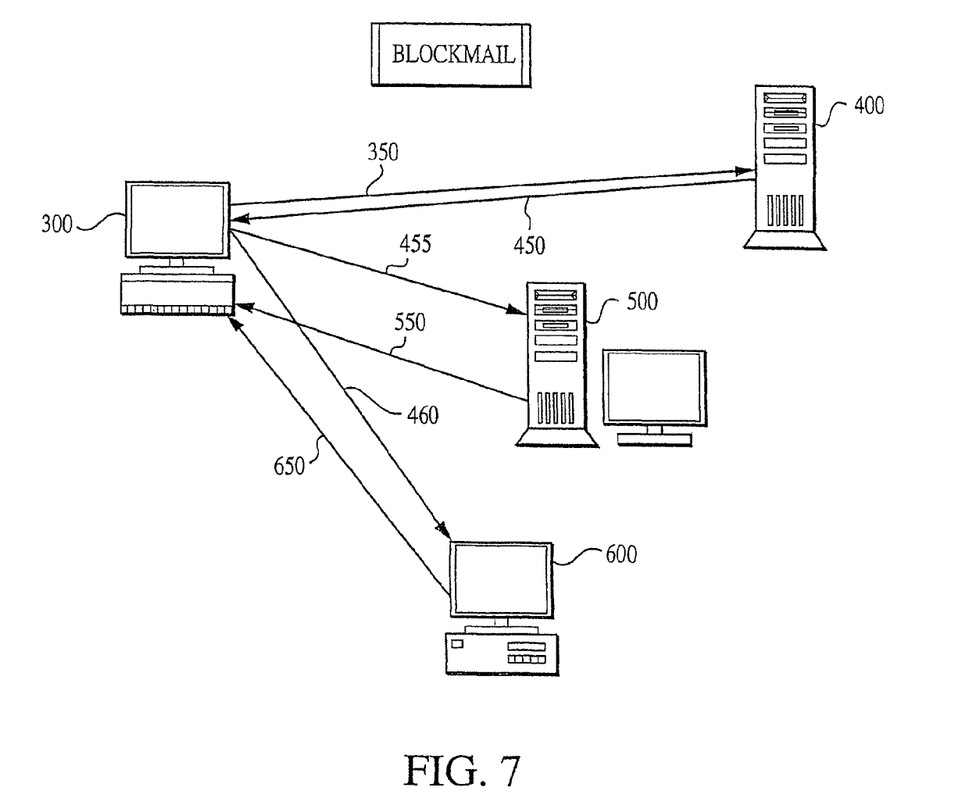
FIG. 7 is a schematic illustration of plural computers which interact to send, receive, and process/authenticate e-mail according to the present invention.

When verifying that a user is a valid user by sending a verification request in the form of an e-mail message, the system creates and transmits an e-mail message and examines the verification response as shown in FIGS. 6A, 6B, and 7. The network that connects the computers can either be a local area network, a wide area network, or the Internet. Table I below shows the steps of creating and transmitting an e-mail message and of receiving a delivery result message as shown in FIGS. 6A and 6B.

TABLE I

A. Message Creation
   1. Step 200 - Create Address header
   2. Step 202 - Create Subject
   3. Step 204 - Create Message content
B. Message Transmission
   1. Step 206 - Parse Address Header
   2. Routing Message Based on:
     a) Step 208 - To Field
     b) Step 210 - From Field
       Step 212 - Transmit Message to Test From Address for validity
     c) Step 214 - Reply Field
       Step 216 - Transmit Message to Test Reply Address for validity
     d) Step 218 - Received 1 Field
       Step 220 - Transmit Message to Test for Validity
     e) Step 222 - Received 2 Field
       Step 224 - Transmit Message to Test for Validity
     f) Step 226 - Received 3 Field
       Step 228 - Transmit Message to Test of Validity
C. Message Receipt
   1. Step 230 - Server Receive Messages
     a) Step 232 - Review results of tests
     b) Step 234 - Apply rules based on test results
     c) Step 236 - Assign confidence rating
     d) Step 238 - File mail based on confidence rating rule
   2. Step 240 - Local Receive Message
     a) Step 240 - Review results of tests
     b) Step 242 - Apply rules based on test results
     c) Step 243 - Assign confidence rating
     d) Step 244 - File mail based on confidence rating rule Referring now to FIG. 7, a plurality of computers which interact to send, receive, and process/authenticate e-mail according to the present invention is shown. An electronic mail message is created on a computer 300 and sent to one or more addresses. The message can travel through one or more computers 400, 500, and 600 to its destination on paths such as, for example, exemplified by 350, 450, 455, 460, 550, and 650. At the destination, an automatic reply or replies can be created and sent. In accordance with the present invention, the replies are monitored to verify their delivery and monitor any information regarding delivery problems. Conclusions are drawn based upon the delivery information and other aspects of the originally received message. A confidence rating is then assigned to the original message's validity based on a scale from 0-100%, with 100% being the rating given to a message considered to be junk e-mail or spam.

Figure 8:
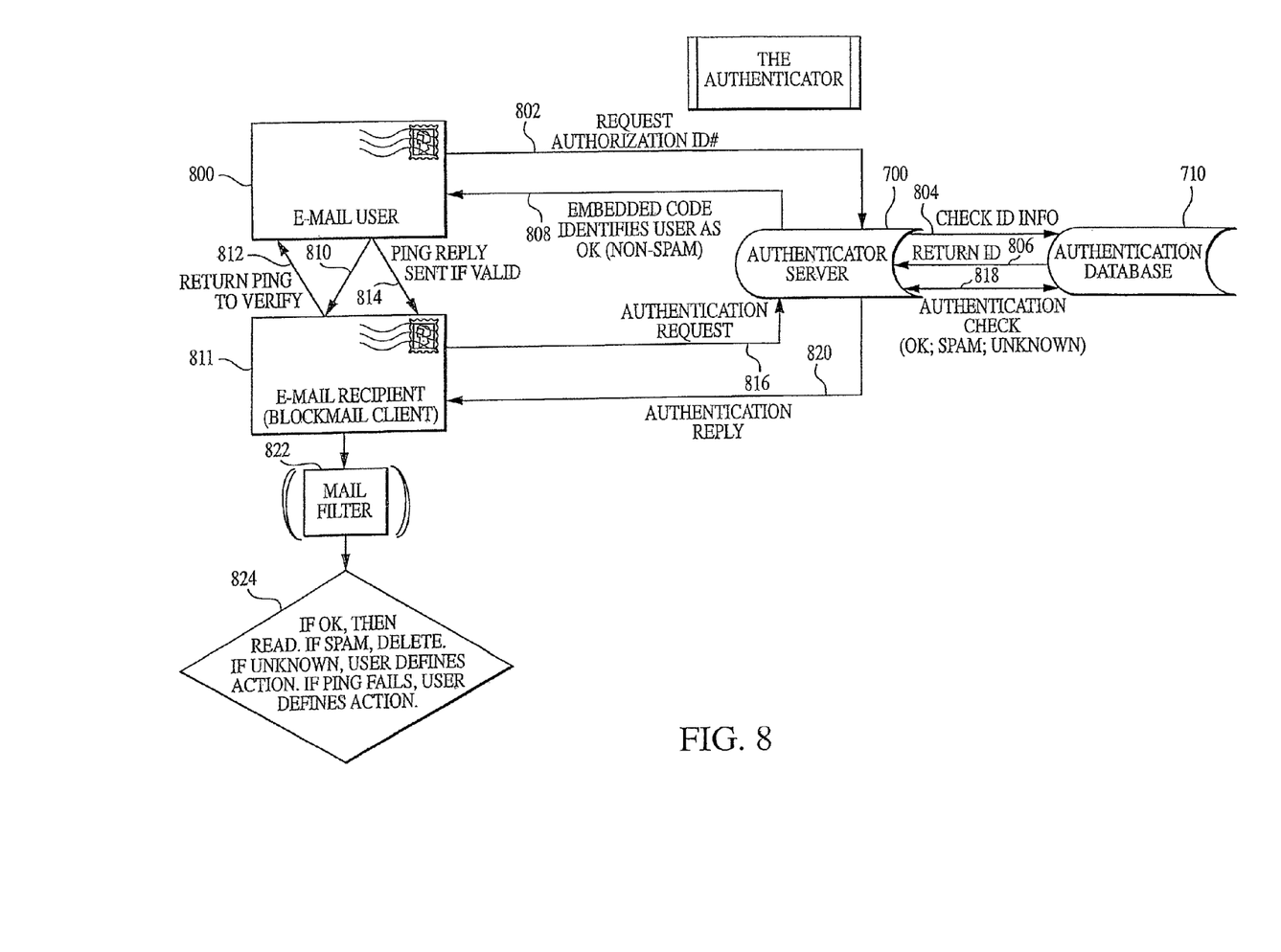
FIG. 8 is a schematic illustration of the operation of the authenticator of the present invention.

With reference to FIG. 8, an additional level of verification is provided in the system of the present invention by including an authentication server 700 and authentication database 710. In the system of the present invention, the verification is implemented using the authenticator by calling the authentication server 700 and verifying that the id issued to the mail originator remains valid and has not been reported as a spam abuser. If a recipient has received spam, the recipient can simply put the term "spam" in the subject of the e-mail message and send it to the authentication server 700, and the id is matched with a spam designation based upon the number of mail recipients reporting the problem. After a set number (n) of spam reports, the id is assigned to the SPAM section of the authentication database 710.

As shown in FIG. 8, the general mail blocking program can be supplemented with an authenticator component to enable cooperative determination of junk e-mail. This works just as described above, except that it adds the facility of replying to an address supplied by the present invention to the subscriber. Users of the present invention would be provided with an authentication code certifying that they are not known spammers. In effect, the system would vouch for the authenticity, and the "spam check" would be sent to the system of the present invention and auto-responded to. If it turned out that the sender had abused his authentication privileges, the authentication address would be added to a list that automatically responds with a known key phrase in the subject line of the message so that the recipient would know immediately that this sender is not trustworthy. This eliminates having to reply to the original sender, who may be unknown due to blind carbon copies (BCCs), etc. Further, the authenticator would potentially be receiving additional information on whether or not a message was a junk e-mail while the message was present in a user's inbox. If the message was determined to be a junk e-mail, the mail program would be informed, and the user would be able to have the message automatically discarded or to be marked as potentially junk. If a message has previously been checked but the message was not yet known to be junk, and if the user has not yet read the message, the authenticator may "call back" the mail program that previously checked the message and identify that the message, although previously thought to be okay, is now believed to be junk.

In order to provide each user with an authentication ID that the authenticator can use to quickly determine if the sender is a known junk e-mailer, the e-mail users would each register, potentially for a fee, and their e-mail program would be assigned a unique identification code. Preferably, the e-mail program would maintain the unique code in secret by the mail program such that the users and others would not see the message. For example, to prevent a recipient from stealing a unique code of another user from which he/she has received a message, the e-mail program or the e-mail handling system at an ISP or corporate level could strip the unique code before delivering the message. That is, when a message is received, the mail program or mail handling system would send the unique code and the "From:" identifier to the authenticator for authentication. The code and the "From." Identifier would be checked against the database of known junk e-mailers as well as checked for consistency between the two parts. If the code was for a known junk e-mailer, or if the code and the "From:" field did not match, the mail program or mail handling system would be warned of the problem. Since the message would then be authenticated, the unique code would no longer be needed and could be stripped before passing the mail message to the user.

With reference to FIG. 8, an e-mail user 800 requests an Authorization ID#802 by sending a request to the authentication server 700. The authentication server 700 checks the user's identification information 804 by accessing the authentication database 710, and returns the id 806 to the authentication server 700. The authentication server 700 sends an embedded code that identifies the user as OK (non-spam) 808 back to the user 800. The e-mail message is sent 810 by the user 800 to the e-mail recipient 811. The verification process previously described is carried out by the system, as represented by "Return Ping to verify" 812 and "Ping reply sent if valid" 814. Upon receipt of the e-mail message by the recipient 811, an authentication request 816 is sent to the authentication server 700. An authentication check 818 is performed by accessing the authentication database 710 and checking the id to determine if the id is for a e-mail user that is OK, SPAM, or Unknown. This information—OK, SPAM, or Unknown—is returned to the authentication server 700 and sent as an authentication reply 820 to the e-mail recipient 811. The received e-mail message is then passed through a mail filter 822 and an action 824 is taken based on the authentication reply. If the e-mail message is OK, then the message is read by the recipient. If the e-mail message is SPAM, then the message is deleted. If the message is designated Unknown, the e-mail recipient decides what action to take. In the event that the "ping" has failed, the e-mail recipient decides what action to take.

In an alternate embodiment, the unique code is further protected by being used in conjunction with message signing and encryption. The mail program (or mail handling system) would send the authenticator a message to be authenticated, including the digitally signed part, the signature, and the unique code. The authenticator then would check the signed part of the message against the signature using the encryption key which is registered to the unique code. In this way, added protection from junk e-mail is obtained.

In an alternate embodiment, e-mail programs would send mail to be authenticated directly to an authentication server. The authentication server would check the message as in any of the above methods. When the authenticator had verified that the message was not part of a junk e-mail effort, the authenticator would "sign" the message and send the signed message on to its intended recipient. The user's mail program that eventually received the message would be able to authenticate it immediately as having been pre-authenticated, either by the signature or by the IP address from which the "signed" message was received. This would avoid the mail program from having to perform a remote communication before delivering the message.

In an alternate embodiment, a series of "seeded" e-mail addresses would be provided on the e-mail service that would be considered early warning notification of a junk e-mail effort. These addresses would correspond to non-existent or ghost accounts which a system has reserved for junk e-mail detection, e.g., Al Aardvark and Arnie Apple. If these messages use the first set of ASCII characters, then the system would be notified early when Al Aardvark and Arnie Apple receive the beginning of a mass junk e-mailing. Thus, the system could immediately identify the remaining messages with the same or similar contents as junk email. An alternate way to do this would be to "seed" newsgroups and member profiles with phony addresses that only the provider would know of. As a result, these addresses could be watched for incoming junk e-mail and a notification from the authentication server could then be broadcast to users indicating that mail with the subject of "XYZ" is junk e-mail. This would allow the client or server of the present invention to automatically eliminate the junk e-mail. Alternatively, a user requesting a service provider to handle this automatically would have the seeded addresses watched, notice the junk e-mail, and automatically prevent the mail from being transmitted any further to users that have requested services of the system of the present invention.

All of the above are only some of the examples of available embodiments of the present invention. Those skilled in the art will readily observe that numerous other modifications and alterations may be made without departing from the spirit and scope of the invention.

The invention claimed is:

1. A method for determining the status of an electronic mail message as SPAM or as a valid message comprising the steps of:
   receiving an incoming electronic mail message, said incoming electronic mail message including sender origination information;
   creating a verification request to be sent to a purported sender of the incoming electronic mail message based at least in part on the sender origination information;
   sending the verification request to the purported sender;
   receiving a verification response including information relating to the deliverability of the verification request; and
   determining the status of said incoming electronic mail message as SPAM or as a valid message based at least in part on said information relating to the deliverability of the verification request, wherein said email message header further comprises a "Reply-To" field, and wherein said method further comprises the steps of:
   parsing said e-mail message header to identify a user id and a host name in the "Reply-To" field of said e-mail message header;
   creating a "Reply-To" verification request to be sent to said user id in the "Reply-To" field at said host name in the "Reply-To" field to determine whether the user id and the host name in the "Reply-To" field are valid;
   sending the "Reply-To" verification request to said user id in the "Reply-To" field at said host name in the "Reply-To" field;
   receiving a verification response including information relating to the deliverability of the "Reply-To" field verification request; and
   determining the status of said incoming electronic mail message as SPAM or as a valid message based at least in part on said information relating to the deliverability of the "Reply-To" verification request.

2. The method of claim 1, wherein said sender origination information includes at least one electronic mail address and wherein said verification request is sent to said at least one electronic mail address.

3. The method of claim 1, further comprising the step of:
   assigning a confidence rating to said incoming electronic mail message based at least in part on said information relating to the deliverability of the verification request.

4. The method of claim 3, further comprising the step of:
   blocking delivery of said incoming electronic mail message to the intended recipient based on the confidence rating assigned to said message.

5. The method of claim 1, wherein said sender origination information includes an e-mail message header comprising a "From" field and a "To" field, and wherein said method further comprises the steps of:
   parsing said e-mail message header to identify a user id and a host name in the "From" field of said e-mail message header, and wherein said verification request is sent to said user id at said host name to determine whether the user id and the host name are valid.

6. The method of claim 1, further comprising the step of:
   assigning a confidence rating to said incoming electronic mail message based at least in part on said information relating to the deliverability of the verification request based on the "From" field and based on the "Reply-To" verification request, and
   wherein the determination of the status of said incoming electronic mail message as SPAM or as a valid message is based on comparing the confidence rating with a pre-determined value set by the intended recipient of the incoming electronic mail message.

7. The method of claim 1, wherein said incoming electronic mail message includes message content, and wherein said method further comprises the steps of:
   maintaining a list of one or more phrases and keywords identified as indicating that an electronic mail message is likely SPAM;
   parsing said message content to determine whether said message content includes a phrase or keyword from said list of one or more phrases and keywords; and assigning a confidence rating to said incoming electronic mail message based at least in part on whether said message content includes one or more phrases and keywords from said list of one or more phrases and keywords, and
   wherein the determination of the status of said incoming electronic mail message as SPAM or as a valid message is based on comparing the confidence rating with a pre-determined value set by the intended recipient of the incoming electronic mail message.

* * * * *